(12) United States Patent
Nilsson

(10) Patent No.: US 7,721,207 B2
(45) Date of Patent: May 18, 2010

(54) CAMERA BASED CONTROL

(75) Inventor: Peter Alexander Nilsson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 562 days.

(21) Appl. No.: 11/421,289

(22) Filed: May 31, 2006

(65) Prior Publication Data

US 2007/0283296 A1 Dec. 6, 2007

(51) Int. Cl.
*G06F 15/00* (2006.01)
*G06F 13/00* (2006.01)

(52) U.S. Cl. ...................... 715/707; 715/726

(58) Field of Classification Search ......... 715/763–764, 715/726–728, 851–853, 707; 345/173–176
See application file for complete search history.

(56) References Cited

U.S. PATENT DOCUMENTS

| | | | | |
|---|---|---|---|---|
| 5,864,334 | A | 1/1999 | Sellers | 345/168 |
| 6,363,160 | B1 | 3/2002 | Bradski et al. | 382/103 |
| 6,901,561 | B1 | 5/2005 | Kirkpatrick et al. | |
| 7,283,983 | B2 * | 10/2007 | Dooley et al. | 706/20 |
| 7,460,690 | B2 * | 12/2008 | Cohen et al. | 382/103 |
| 2002/0140667 | A1 | 10/2002 | Horiki | 345/156 |
| 2004/0193413 | A1 | 9/2004 | Wilson et al. | |
| 2004/0215689 | A1 | 10/2004 | Dooley et al. | |
| 2005/0063564 | A1 | 3/2005 | Yamamoto et al. | 382/104 |
| 2007/0173240 | A1 * | 7/2007 | Lim | 455/418 |

FOREIGN PATENT DOCUMENTS

| | | |
|---|---|---|
| EP | 1 189 475 A1 | 3/2002 |
| WO | WO 01/27895 | 4/2001 |
| WO | WO 2005/091125 A2 | 9/2005 |

OTHER PUBLICATIONS

The International Search Report and Written Opinion for corresponding PCT Application No. PCT/IB2006/054537 mailed Feb. 22, 2008, 15 pages.
The International Preliminary Report on Patentability for corresponding international application No. PCT/IB2006/054537 dated Sep. 11, 2008, 10 pages.

* cited by examiner

*Primary Examiner*—Kevin Nguyen
(74) *Attorney, Agent, or Firm*—Harrity & Harrity, LLP

(57) ABSTRACT

A communication device may include a lens and processing logic. The lens may receive a gesture made by a user of the mobile terminal and the processing logic may identify the gesture. The processing logic may also generate a command based on the identified gesture, where the command instructs the mobile terminal or an external device to perform a control action.

28 Claims, 7 Drawing Sheets

CAMERA BASED CONTROL

TECHNICAL FIELD OF THE INVENTION

The invention relates generally to performing control actions and, more particularly, to performing control actions using a camera.

DESCRIPTION OF RELATED ART

Communication devices, such as cellular telephones, have become increasingly versatile. For example, cellular telephones today often include applications that allow users to do more than just make and receive telephone calls, such as send/receive text messages, play music, play video games, take pictures, etc. As a result, cellular telephones have become an increasingly common part of every day life for a large number of users.

SUMMARY

According to one aspect, a mobile terminal may include a lens and processing logic. The lens is configured to receive a gesture made by a user of the mobile terminal and the processing logic is configured to identify the gesture and generate a command based on the identified gesture, where the command instructs the mobile terminal or an external device to perform a control action.

Additionally, the mobile terminal may comprise a memory configured to store a plurality of images, where each of the images corresponds to one of a plurality of commands.

Additionally, each of the plurality of images corresponds to a gesture made using one or more fingers.

Additionally, when identifying the gesture, the processing logic is configured to compare the gesture to the plurality of images and identify a first one of the plurality of images as corresponding to the gesture.

Additionally, when generating a command, the processing logic is configured to identify a first command corresponding to the first image.

Additionally, the gesture may comprises a motion made in front of the lens by the user using at least one hand. When identifying the gesture, the processing logic is configured to identify a first pattern associated with the motion and when generating a command, the processing logic is configured to identify a first command as corresponding to the first pattern.

Additionally, the mobile terminal may further comprise a transmitter configured to transmit the command to the external device.

Additionally, the external device may comprise a television, a digital video disc player or a video game system and the command instructs the external device to at least one of increase volume, decrease volume, change a channel, pause the external device or turn off the external device.

Additionally, the external device may play music and the command instructs the external device to increase volume, decrease volume, skip to another song, go back to a previous song or stop playing a song.

Additionally, the processing logic may be further configured to perform a control action for an application executed by the mobile terminal in response to the command.

Additionally, the control action may comprise at least one of increasing volume of a song being played by the mobile terminal or output to the external device, decreasing volume of a song being played by the mobile terminal or output to the external device, skipping to another song, or stopping playing of a song being played by the mobile terminal or output to the external device.

Additionally, the processing logic may be further configured to provide a user interface configured to allow a user to provide gestures to the mobile terminal, where each of the gestures corresponds to one of a plurality of commands.

Additionally, when allowing the user to provide gestures, the lens is configured to focus on a first gesture provided by the user in response to a prompt via the user interface, where the first gesture includes at least a portion of the user's hand. The processing logic is also further configured to identify the first gesture and correlate the first gesture to a first one of the plurality of commands.

Additionally, the mobile terminal may comprise a cellular telephone.

According to another aspect, a method performed by a communication device may comprise capturing a gesture provided by a user of the communication device and identifying the gesture. The method may also include generating a command based on the first gesture, where the command instructs the communication device to perform a control action.

Additionally, the gesture may comprise a motion made in front of a lens of the communication device by the user using at least one hand and the identifying the gesture may comprise identifying a first pattern associated with the motion and correlating the first pattern to a first gesture. The generating a command may comprise generating a first command corresponding to the first pattern.

Additionally, the gesture may comprise an image captured by a lens of the communication device and the method may further comprise storing a plurality of images in the communication device, each of the plurality of images being associated with one of a plurality of commands. The identifying the gesture may comprise comparing the captured image to the plurality of stored images and identifying a first one of the plurality of stored images as corresponding to the captured image.

Additionally, each of the plurality of stored images includes a gesture made using one or more fingers.

Additionally, the method may comprise transmitting the command to an external device, where the command instructs the external device to perform a control action on the external device.

Additionally, the transmitting the command to an external device may comprise transmitting the command to a television, a digital video disc player or a video game system, the command instructing the external device to at least one of increase volume, decrease volume, change a channel or turn off the external device.

Additionally, the transmitting the command to an external device may comprise transmitting the command to an external device that plays music, the command instructing the external device to increase volume, decrease volume, skip to another song, go back to a previous song, or stop playing a song.

Additionally, the method may comprise performing a control action in response to the command, the control action comprising at least one of increasing volume of a song being played by the communication device or output to an external device, decreasing volume of a song being played by the communication device or output to the external device, skipping to another song or stopping playing of a song being played by the communication device or output to the external device.

Additionally, the method may comprise providing a user interface to a user of the communication device, where the user interface is configured to allow the user to provide a plurality of gestures to the communication device and each of the plurality of gestures corresponds to one of a plurality of commands. The method may further comprise receiving a gesture, identifying a first one of the plurality of commands based on the received gesture and performing an action based on the first command.

Additionally, the performing an action may comprise at least one of increasing volume of a song, decreasing volume of a song, skipping to another song or going back to a previous song.

According to still another aspect, a device is provided. The device comprises means for capturing an image and means for identifying the captured image. The device also includes means for generating a command based on the identified image, where the command instructs the device to perform a control action.

Additionally, the device further comprises means for transmitting the command to an external device, the command instructing the external device to perform a control function on the external device.

In still another aspect, a computer-readable medium having stored thereon a plurality of instructions is provided. The instructions which, when executed by at least one processor, cause the at least one processor to receive an image or a motion captured by a lens. The instructions also cause the at least one processor to identify the image or motion captured by the lens as corresponding to a first image or motion and generate a command based on the first image or motion, where the command instructs a mobile terminal on which the at least one processor resides to perform a control action or transmit the command to an external device.

Additionally, the received image or motion may comprise an image made by the user and when identifying the image or motion, the at least one processor is configured to compare the image made by the user to a plurality of stored images.

Additionally, the image or motion may comprise a motion made by the user and when identifying the image or motion, the at least one processor is configured to compare the motion to a plurality of predetermined motions.

Additionally, the instructions further cause the processor to forward the command for transmission to the external device, where the command instructs the external device to perform a control function on the external device.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1A:
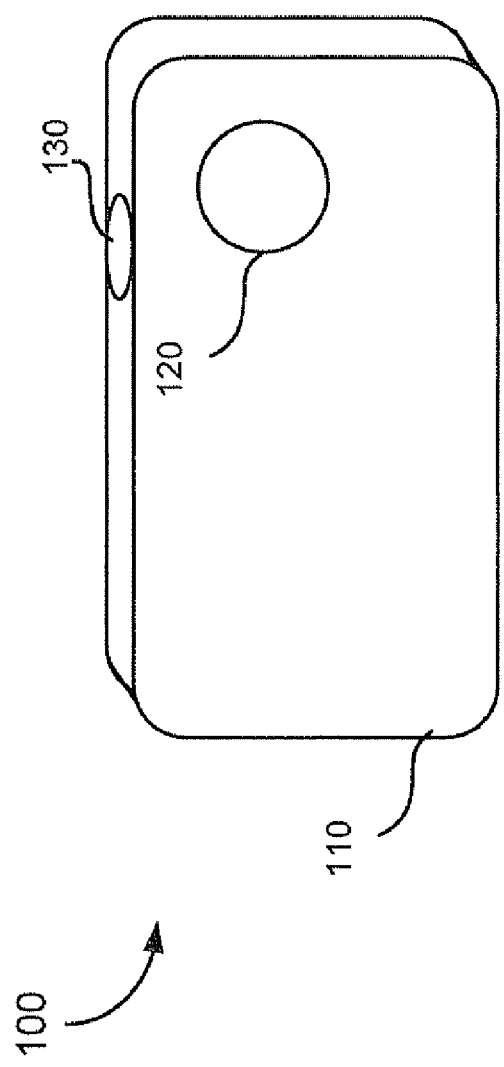
FIGS. 1A and 1B are diagrams of an exemplary mobile terminal in which methods and systems consistent with the invention may be implemented.
Figure 1B:
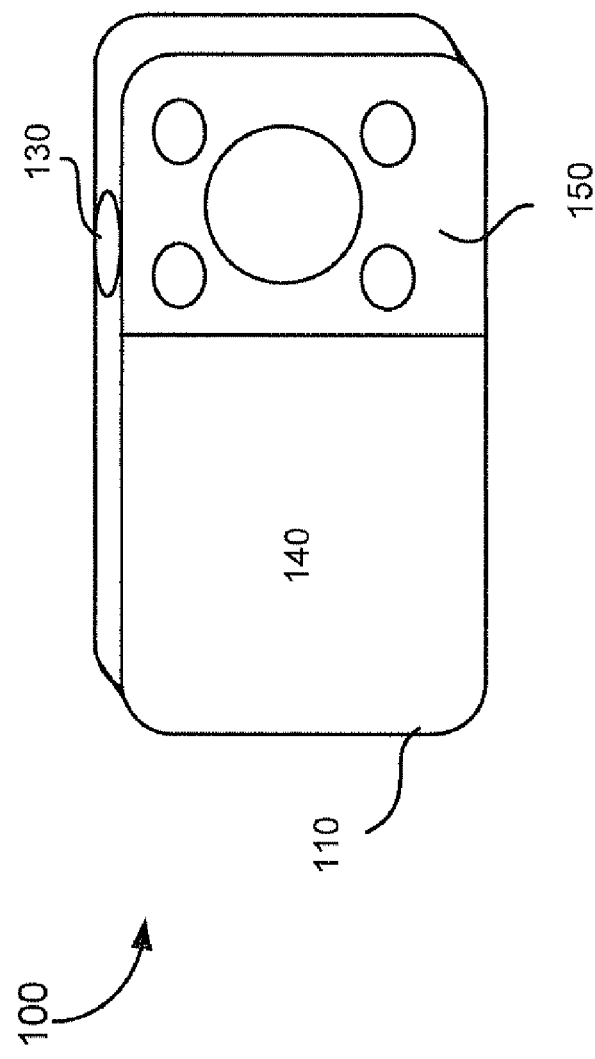

FIGS. 1A and 1B are front side and back side views of an exemplary mobile terminal 100 in which systems and methods consistent with the invention may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. It should also be understood that aspects of the invention may also be implemented in other devices that do not include communication functionality associated with making and receiving telephone calls.

For example, mobile terminal 100 may include any client device, such as a remote control device (e.g., a universal remote control), a PDA, a web-based appliance, a personal computer (PC), a laptop computer etc., that is able to perform image or motion recognition and generate various control commands. For example, mobile terminal 100 may include a remote control device that is able to remotely control, for example, a television, a stereo, a video cassette recorder (VCR), a digital video disc (DVD) player, a compact disc (CD) player, a video game system, etc.

Referring to FIG. 1A, mobile terminal 100 may include housing 110, lens 120 and shutter button 130. Housing 110 may protect the components of mobile terminal 100 from outside elements. Lens 120 may focus light and may include a number of lens elements. A lens cover (not shown) may be controlled to uncover lens 120 to permit the user to tale pictures and cover lens 120 when the camera is not in use. Shutter button 130 may be pressed by a user to take a picture.

FIG. 1B illustrates the back side of mobile terminal 100. Referring to FIG. 1B, mobile terminal 100 includes display screen 140 and user control area 150. Display screen 140 may be a liquid crystal display (LCD) or some other type of display screen that allows the user to view images that will be captured when the user takes a picture. In some implementations, lens 120 may be located on the same side of mobile terminal 100 as display screen 140.

User control area 150 may include controls associated with placing telephone calls via mobile terminal 100. For example, user control area 150 may include a dial button, hang up button, etc. User control area 150 may also include a menu button that permits the user to view a menu associated with selecting functions, such as a remote control function for mobile terminal 100 or a camera function for mobile terminal 100, as described in detail below.

Figure 2:
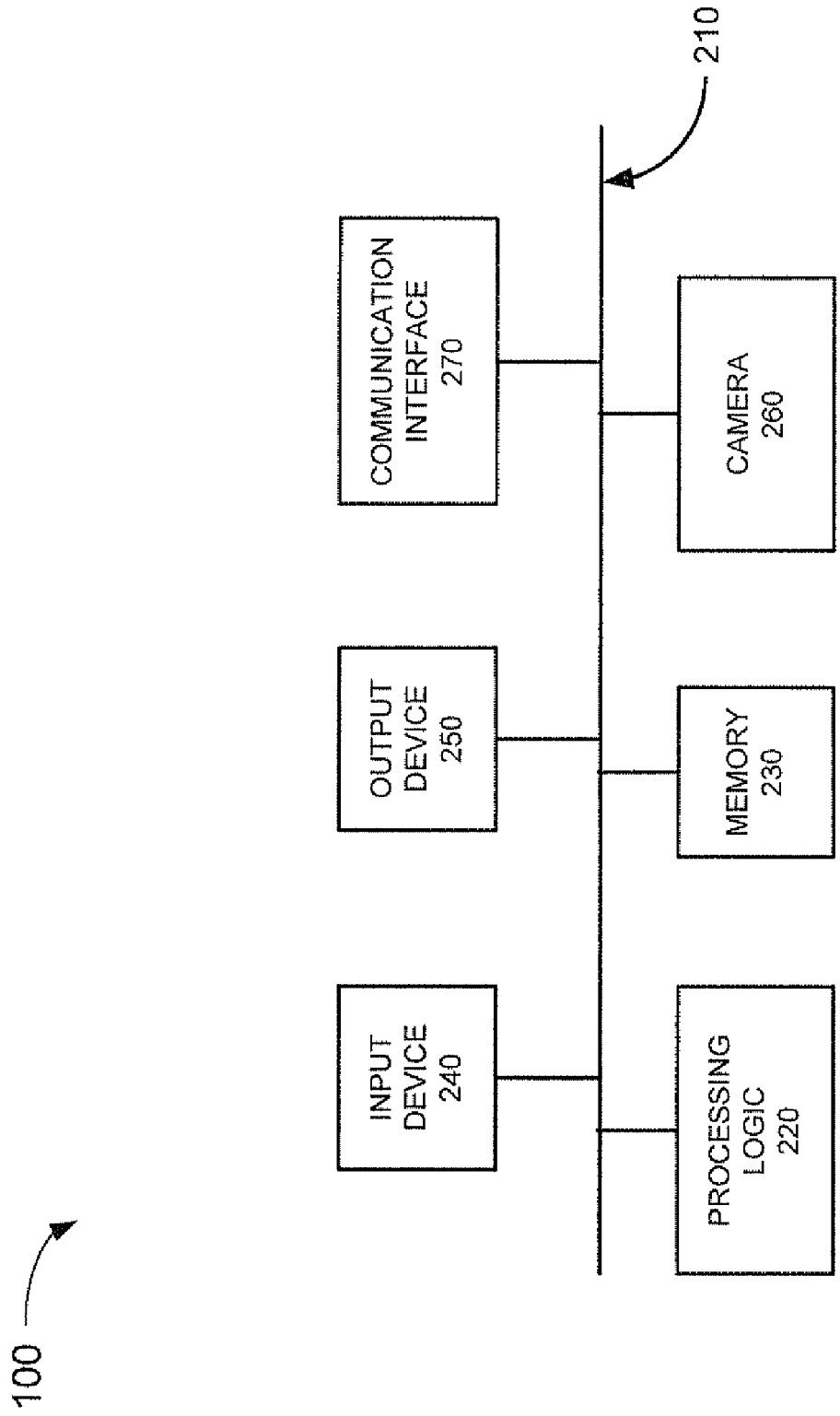
FIG. 2 is an exemplary block diagram of the mobile terminal of FIGS. 1A and 1B according to an implementation consistent with the invention.

FIG. 2 is a diagram of mobile terminal 100 according to an exemplary implementation consistent with the invention. Mobile terminal 100 may include bus 210, processing logic 220, memory 230, input device 240, output device 250, camera 260 and communication interface 270. Bus 210 permits communication among the components of mobile terminal 100. One skilled in the art would recognize that mobile terminal 100 may be configured in a number of other ways and may include other or different elements. For example, mobile terminal 100 may include one or more power supplies (not shown). Mobile terminal 100 may also include a modulator, a demodulator, an encoder, a decoder, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220

Input device 240 may include any mechanism that permits an operator to input information to mobile terminal 100, such as a microphone, a keyboard, a keypad, a mouse, a pen, voice recognition and/or biometric mechanisms, etc. Input device 240 may also include one or more buttons, such as a button in user control area 150 (FIG. 1B), that allows a user to receive a menu of options via output device 250. The menu may allow the user to select various functions or modes associated with applications executed by mobile terminal 100. Alternatively, input device 240 may include one or more buttons in control area 150 that allows a user to activate a particular mode for mobile terminal 100, such as a mode associated with activating a remote control function associated with mobile terminal 100.

Output device 250 may include one or more conventional mechanisms that output information to the user, including a display, a printer, one or more speakers, etc. Output device 250 may also include a vibrator mechanism that causes mobile terminal 100 to vibrate when an incoming call is received.

Camera 260 may include conventional camera elements, such as lens 120 and shutter button 130, that enable mobile terminal 100 to take pictures. Camera 260 may store the pictures in, for example, memory 230 or in another memory. Camera 260 may also be used to perform control actions associated with applications executed by mobile terminal 100 and/or control actions performed by external devices, as described in detail below.

Communication interface 270 may include any transceiver-like mechanism that enables mobile terminal 100 to communicate with other devices and/or systems. For example, communication interface 270 may include a modem or an Ethernet interface to a LAN.

Communication interface 270 may also include other mechanisms for communicating via a network, such as a wireless network. For example, communication interface 270 may include one or more radio frequency (RF) transmitters and receivers and/or transceivers for transmitting RF data. Communication interface 270 may also include one or more antennas for transmitting/receiving data, such as RF data. Communication interface 270 may also include an infrared (IR) transmitter and receiver and/or transceiver that enables communication interface 270 to communicate with other devices via infrared communications. For example, in one implementation, mobile terminal 100 may act as a remote control device to control operation of another device, such as a television, stereo, etc. In this case, mobile terminal 100 may transmit commands to the other device via, for example, an IR signal/protocol, an RF signal/protocol, etc.

Mobile terminal 100, consistent with the invention, may perform processing associated with controlling various applications executed by mobile terminal 100 and/or controlling other devices, as described in detail below. Mobile terminal 100 may perform these operations in response to processing logic 220 executing sequences of instructions contained in a computer-readable medium, such as memory 230. Such instructions may be read into memory 230 from another computer-readable medium via, for example, communication interface 270. A computer-readable medium may include one or more memory devices and/or carrier waves. In alternative embodiments, hard-wired circuitry may be used in place of or in combination with software instructions to implement processes consistent with the invention. Thus, implementations consistent with the invention are not limited to any specific combination of hardware circuitry and software.

Figure 3:
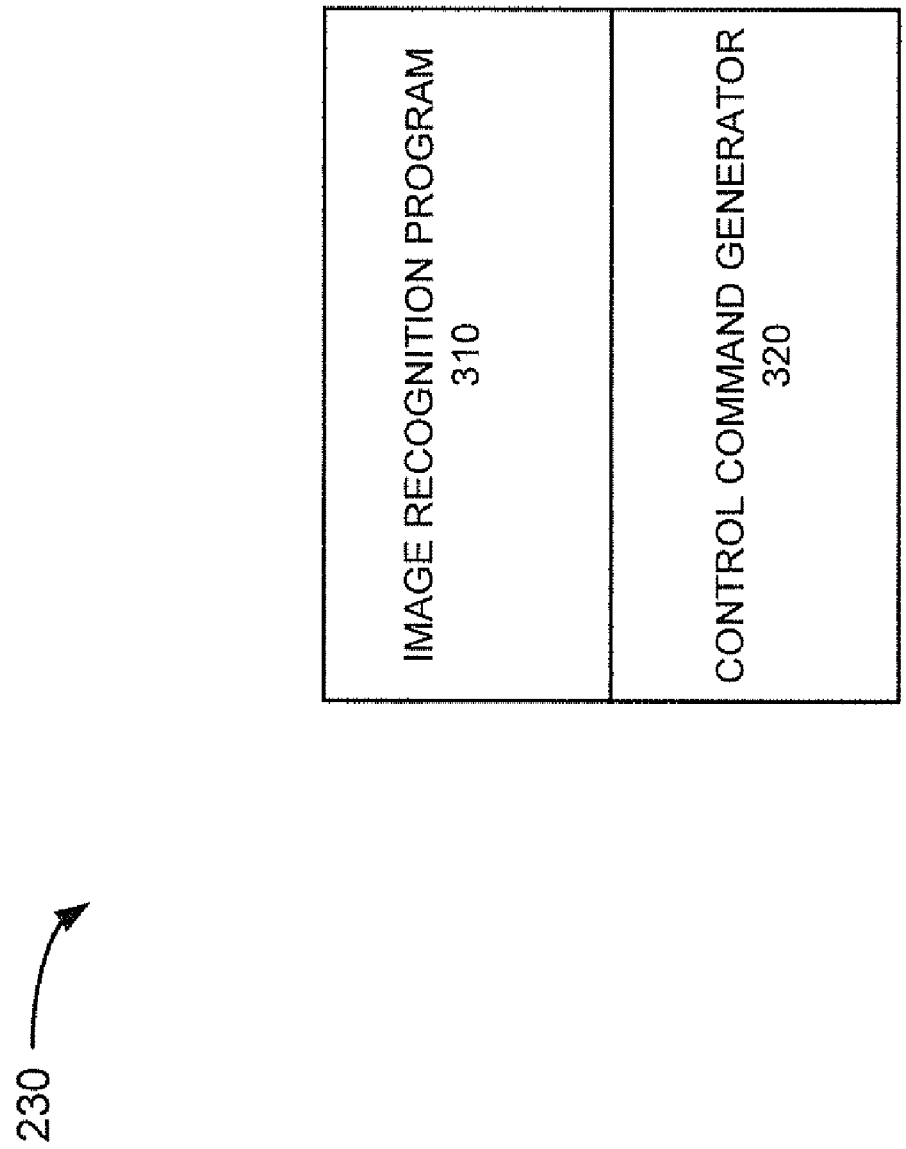
FIG. 3 is a an exemplary functional block diagram of components implemented in the mobile terminal of FIG. 2 according to an implementation consistent with the invention.

FIG. 3 is a functional block diagram of exemplary components implemented in mobile terminal 100 of FIG. 2, such as in memory 230, according to an implementation consistent with the invention. Referring to FIG. 3, memory 230 may include image recognition program 310 and control command generator 320. Image recognition program 310 may include any type of image recognition software and/or hardware that can recognize various images and/or motions and output information based on the recognized image or motion.

For example, image recognition program 310 may be preconfigured to recognize various images, such as various hand gestures (e.g., an outstretched hand held up to indicate stop, a finger pointing in a particular direction (e.g., up, down, left, right), etc. Image recognition program 310 may also be preconfigured to recognize various motions and/or motion patterns, such as various hand-related gestures (e.g., a hand moving in front of lens 120 from right to left, bottom to top, etc). The term "gesture" as used herein includes static (i.e., non-moving) symbols, positions or shapes made using one or more hands or other body parts and also motions or motion patterns made using one or more hands, other body parts or other devices. These gestures may be correlated to various control actions, as described in more detail below. In another implementation, image recognition program 310 may include a user interface in which a user of mobile terminal 100 may "train" image recognition program 310 to correlate various images and/or motion patterns to various control actions, as described in more detail below.

In an exemplary implementation, image recognition program 310 may receive a gesture via lens 120 and determine whether the gesture corresponds to one of the gestures stored in image recognition program 310 or corresponds to a pre-defined motion pattern recognized by image recognition program 310. Image recognition program 310 may then forward information identifying the gesture to other devices/applications in mobile terminal 100, such as control command generator 320.

Control command generator 320 may receive information from image recognition program 310 and generate commands to control an application executed by mobile terminal 100 or control an external device, as described in detail below. For example, in one implementation, control command generator 320 may be configured to perform control actions associated with music being played by mobile terminal 100. In other implementations, control command generator 320 may be configured to generate commands to control an external device, such as a television, a video display monitor, a stereo, a CD player, a DVD player, etc. In each case, control command generator 320 may include pre-stored control commands or codes that correspond to commands used to perform the desired control action for the particular device. For example, control command generator 320 may store commands/codes that may be transmitted to the external device to perform the desired function, e.g., increase the volume, change a channel, skip to a next song, etc. In each case, control command generator 320 may receive input from image recognition program 310 and generate appropriate commands, as described in detail below.

Figure 4:
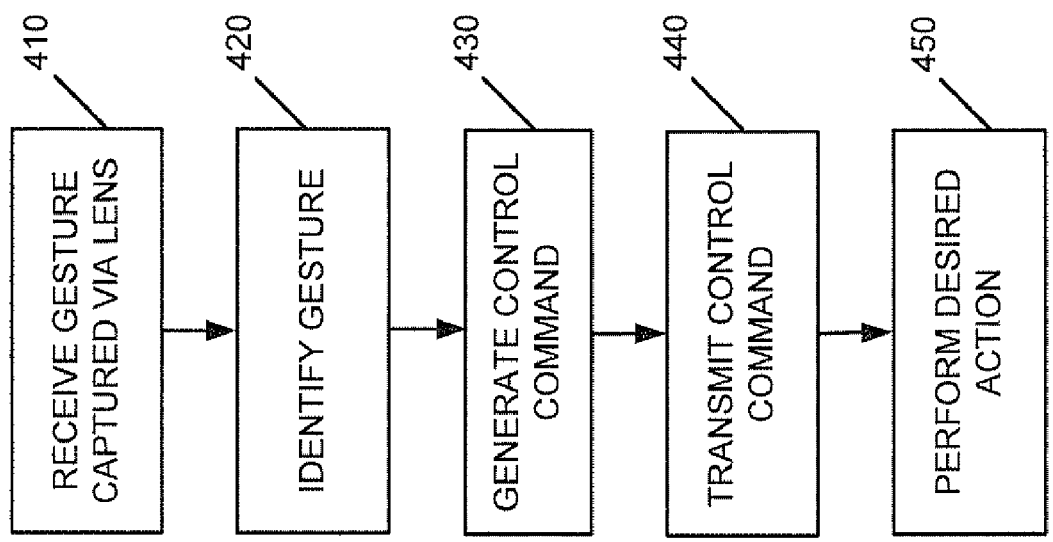
FIG. 4 is a flow diagram illustrating exemplary processing consistent with the invention.

FIG. 4 is a flow diagram illustrating exemplary processing associated with performing a control action to control an application being executed by mobile terminal 100 and/or control an external device. Assume that mobile terminal 100 is powered up and that the user of mobile terminal 100 is using mobile terminal 100 to stream music content to an external stereo system. In this case, communication interface 270 of mobile terminal 100 may stream the music content to an input of the stereo system to allow the music stored on mobile terminal 100 to be played on the stereo system. The streaming music may be transmitted to the stereo system in a wired or wireless manner.

Figure 5:
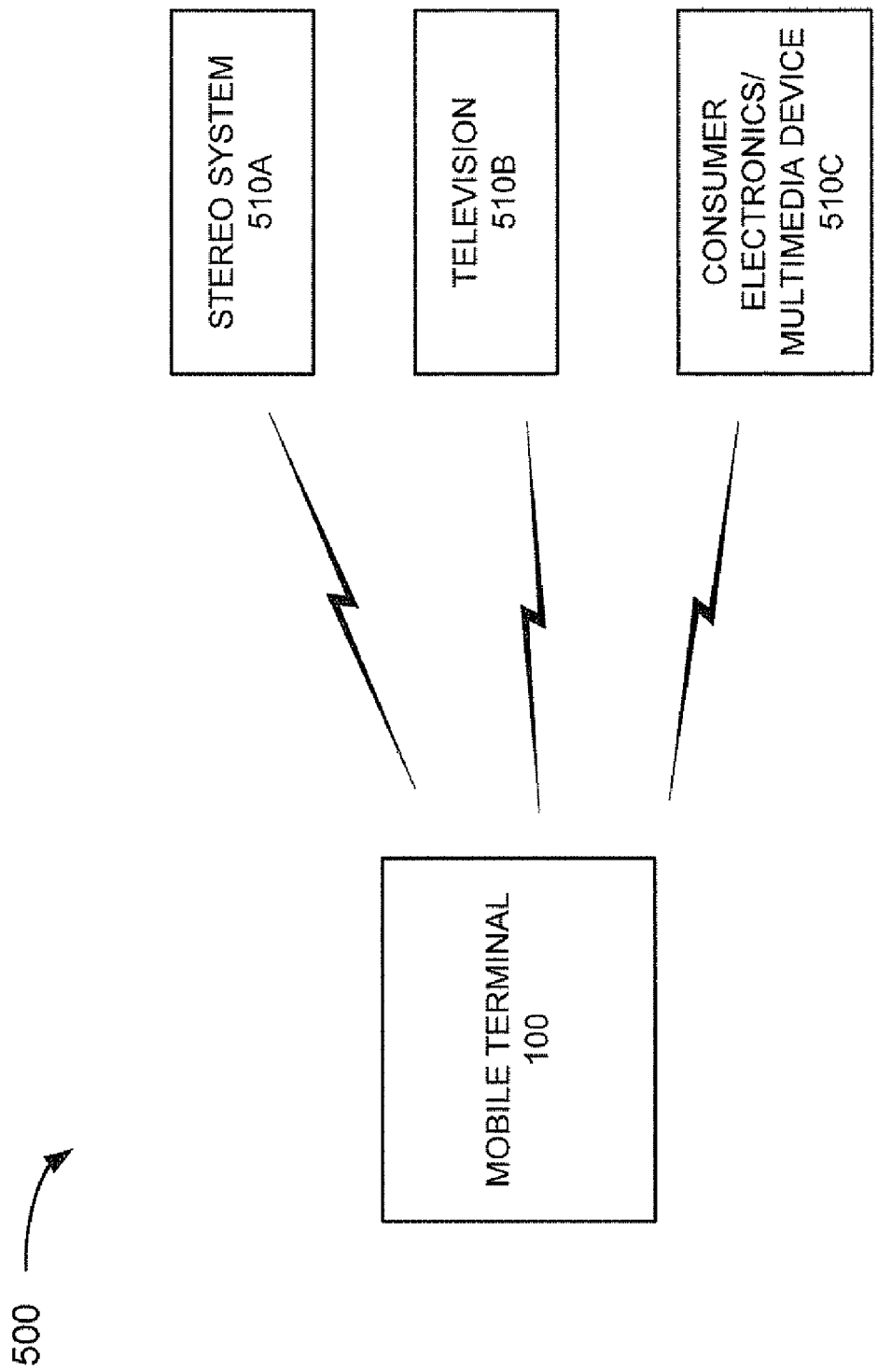
FIG. 5 is a diagram of an exemplary system in which methods and systems consistent with the invention may be implemented.

For example, FIG. 5 illustrates an exemplary system 500 which includes mobile terminal 100 and stereo system 510A. System 500 also may include television 510B and consumer electronics/multimedia device 510C. In some implementations, mobile terminal 100 may perform a particular action with respect to an application being executed by mobile terminal 100 that may affect information being provided to one of devices 510A-C, referred to herein as controllable devices 510. In other implementations, mobile terminal 100 may transmit remote control commands to one of controllable devices 510 to instruct the particular controllable device 510 to perform a particular action.

Further assume that the user of mobile terminal 100 would like to perform a control action, such as skip to another song (e.g., a next song within a list of songs stored in mobile terminal 100). In an exemplary implementation, the user of mobile terminal 100 may move his/her hand in front of lens 120 (FIG. 1A) of mobile terminal 100 and make a particular gesture with his/her hand. For example, in one implementation, the user of mobile terminal 100 may make a gesture such as that illustrated in FIG. 6A (e.g., a hand with the index finger pointing forward). Image recognition program 310 may receive the gesture captured via lens 120 (act 410). The captured gesture may also be displayed via display screen 140. As described previously, in some implementations, lens 120 and display screen 140 may be located on the same side of mobile terminal 100. This may simplify the providing of the desired gesture by the user of mobile terminal 100. In each case, image recognition program 310 may then identify the particular gesture (act 420).

For example, as described previously, image recognition program 310 may identify various images and/or motions captured via elements of camera 260 (e.g., lens 120) as corresponding to various images stored by image recognition program 310 and/or various motions recognized by image recognition program 310. Assume that the image illustrated in FIG. 6A corresponds to an image that is used to indicate that the user wants to skip to the next song or go to a next channel, depending on, for example, the particular application being executed by mobile terminal 100 and/or particular device being controlled by mobile terminal 100. In an alternative implementation, the user of mobile terminal 100 may move his/her hand in front of lens 120 in a particular motion, such as a right to left motion. In this case, the right to left motion may be used to indicate that the user wants to skip to the next song, go to the next channel, etc. In either of these cases, since mobile terminal 100 is streaming audio content (e.g., music) to stereo system 510A in the scenario described above, image recognition program 310 identifies the gesture as corresponding to a skip to next song command. Image recognition program 310 may then forward a message to control command generator 320 indicating that the user has requested that mobile terminal 100 skip to the next song in, for example, a playlist stored on mobile terminal 100.

Control command generator 320 receives the information from image recognition program 310 and generates the appropriate command to cause mobile terminal 100 to perform the desired action (act 430). For example, if the song or group of songs are stored on mobile terminal 100, control command generator 320 may signal processing logic 220 to skip to the next song (act 440).

Processing logic 220 may receive the command from control command generator 320 and signal the application program playing the song to skip to the next song. The music playing application executed by mobile terminal 100 may then skip to the next song (act 450). In this manner, the user of mobile terminal 100 may simply place his/her hand in front of lens 120 in a predetermined manner (e.g., finger pointing forward in this example) or move his/her hand in front of lens 120 in a predetermined motion (e.g., right to left motion) to cause mobile terminal 100 to perform the desired action. This enables the user to, perform various control actions without requiring the user to pick up mobile terminal 100 and press one or more buttons to perform the desired action. Such functionality may be particularly advantageous when the user is busy doing other things.

In an alternative implementation in which mobile terminal 100 is not streaming the music to the stereo system (i.e., stereo system 510A is playing music stored locally on stereo system 510A), control command generator 320 may generate a remote control command signal that will be transmitted to stereo system 510A (act 430). In this implementation, control command generator 320 may be pre-configured to store codes that are recognized by various other devices, such as stereo system 510A, to perform the desired control action. In this case, control command generator 320 generates a control command/code that will be recognized by stereo system 510A as being a command to skip to a next song in, for example, a CD currently being played by stereo system 510A. Mobile terminal 100 may then transmit the remote control command to stereo system 510A via, for example, an IR signal or protocol, an RF signal or protocol or some other signal/protocol (act 440).

Stereo system 510A may receive the remote control signal from mobile terminal 100 and decode the received signal. Stereo system 510A may then perform the desired action (act 450). For example, in this example, stereo system 510A may skip to the next song stored in, for example, a CD being played or a next song in a playlist being played by stereo system 510A. In either case, mobile terminal 100 is able to generate the appropriate command and transmit the command to the appropriate device to perform the desired action.

As another example, assume that the user associated with mobile terminal 10 is watching television 510B and wants to change the channel. In this case, the user moves his/her hand in front of lens 120 to create a predetermine image. For example, if the user wants to increase the volume, the user may point his/her finger forward in a manner similar to that illustrated in FIG. 6A or move his/her hand in front of lens 120 in a bottom to top motion. Image recognition program 310 may recognize the image/motion as corresponding to the image/motion that is used to indicate that the user wants to skip to the next song or change a channel, depending on, for example, the particular application being executed by mobile terminal 100. In this case, assume that mobile terminal 100 is not executing a music playing application. Image recognition program 310 may then determine that the received gesture corresponds to a desire to change the channel of television 510B.

Image recognition program 310 forwards the identified gesture information to control command generator 320. Control command generator 320 may then transmit a code/command to change the channel of television 510. In alternative implementations, other gestures, such as a thumb pointed upward may indicate that the user wants to change the channel of television 510B. In each case, control command generator 320 generates the appropriate remote control code and transmits the code to television 510B. Television 510B may decode the received code and perform the desired function (e.g., change the channel to a next higher channel).

Figure 6B:
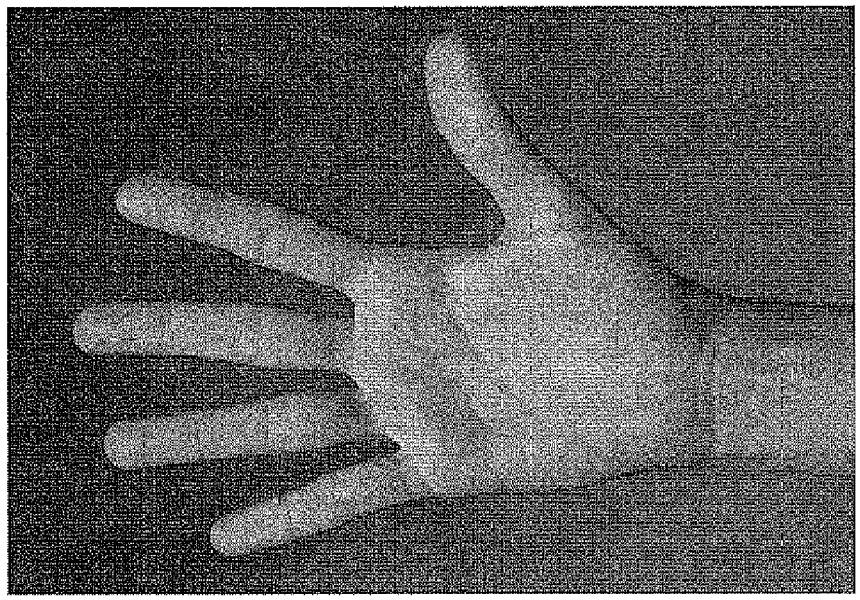
FIGS. 6A and 6B are diagrams illustrating exemplary images or gestures that may be used to generate commands in an implementation consistent with the invention.
Figure 6A:
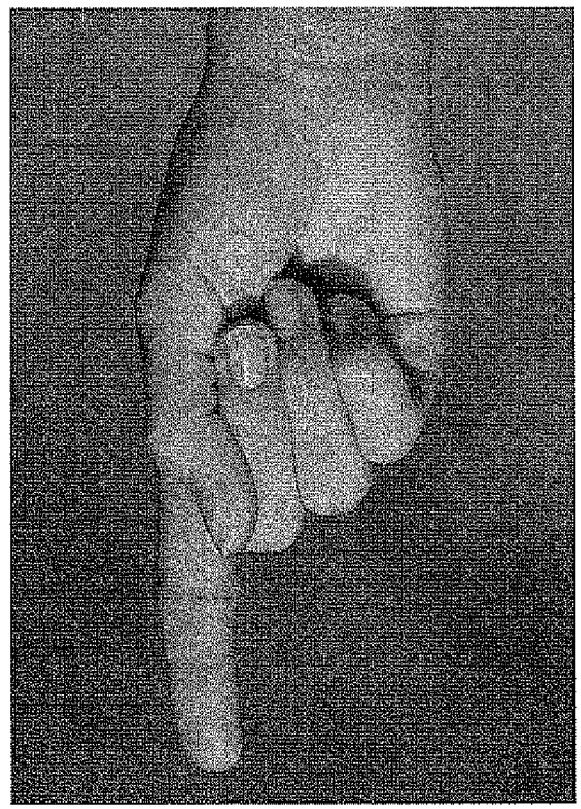

As another example, assume that the user associated with mobile terminal 100 is playing a video game executed by consumer electronics/multimedia device 510C and wants to pause the game. In this case, the user may move his/her hand in front of lens 120 as illustrated in FIG. 6B. Image recognition program 310 may recognize the gesture in FIG. 6B (i.e., outstretched hand indicating stop) as corresponding to the gesture that is used to indicate that the user wants to pause or stop a game or song. In this case, assume that mobile terminal 100 is not executing a music playing application. Image recognition program 310 may then determine that the received gesture corresponds to a desire to pause the game executed by device 510C and forward this information to control command generator 320. Control command generator 320 may then generate the appropriate remote control code/command and transmit the command to device 510C. Device 510C receives the command, identifies the code and pauses/stops the game being played by device 510C.

Figure 7:
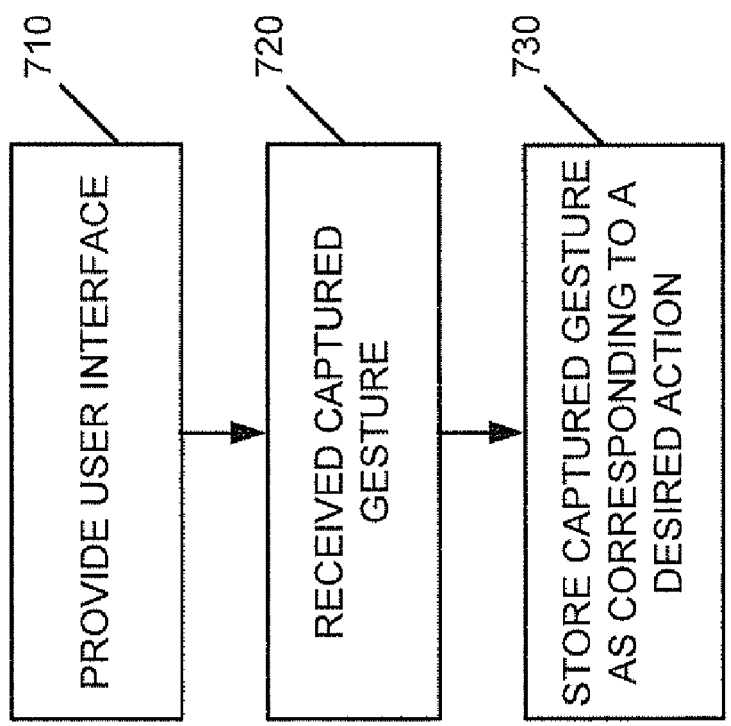
FIG. 7 is a diagram illustrating exemplary processing consistent with an aspect of the invention.

In other implementations, different images, motions or other gestures may be used to control different devices so that no gesture may be used to perform multiple actions. For example, a finger pointing upward may be used to indicate that the user wants to change the channel for television 510B, as opposed to the finger pointing forward in FIG. 6A, which as described above may be used in some implementations to indicate that the use wants to skip to a next song. Other gestures, such as two fingers pointing upward may indicate that the use wants to go two channels forward and/or increase the volume by two increments. In each case, the user of mobile terminal 100 may receive a menu that allows the user to view each pre-stored image, motion or other gesture and its corresponding command. In this manner, the user of mobile terminal 100 knows which gestures may be used to perform various control actions As described above, in some implementations, the user of mobile terminal 100 may interact with mobile terminal 100 to train image recognition program 310 to recognize particular gestures. For example, FIG. 7 illustrates exemplary processing associated with training image recognition program 310. Processing may begin with a user accessing a menu provided via, for example, output device 250 of mobile terminal 100. The menu may include an option for allowing the user to provide various gestures that will be recognized by image recognition program 310. Assume that the user selects this option.

Mobile terminal 100 may then provide a user interface to the user of mobile terminal 100 (act 710). In an exemplary implementation, the user interface may display a number of commands to the user, such as skip a song, go back to a previous song, change a channel, stop a song, increase volume, decrease volume, turn off a device, etc.

Assume that the user selects the command for skipping a song. In this case, the user interface may prompt the user to provide a gesture that he/she would like to correspond to a command for skipping a song. The prompt may further indicate that the user is to place his/her hand in the desired manner (i.e., make the desired hand gesture) in front of lens 120 and press shutter button 130. The user may view the hand gesture via display screen 140 prior to pressing shutter button 130. In this case, image recognition program 310 receives the picture after shutter button 130 is pressed (act 720). Alternatively, the prompt may indicate that the user is to place his/her hand in the desired manner in front of lens 120 for one or more seconds. In this case, image recognition program 310 may capture the image without requiring the user to press shutter button 130. In still other alternatives, the prompt may request that the user move his/her hand in front of lens 120 in a desired motion/patter. The user may then move his/her hand in front of lens 120 in the user's desired manner (e.g., left to right, right to left, top to bottom, bottom to top, etc.). In this case, image recognition program 310 will correlate the motion (e.g., the directional motion associated with movement of the hand in front of lens 120) as corresponding to a command for skipping a song. In each case, image recognition program 310 receives the captured gesture and correlates the gesture as corresponding to command for skipping a song (act 730).

Processing may continue in this manner for a number of other actions. That is, the user may provide gestures for stopping the playing of a song, increasing volume, decreasing volume, turning on/off a device, changing a channel, etc. In this manner, the user's preferred hand gestures are used by mobile terminal 100 to generate particular control actions.

As described above, mobile terminal 100 may use elements of camera 260 to perform various control related actions. Camera 260 also allows the user of mobile terminal 100 to take pictures in a conventional manner. In some implementations, mobile terminal 100 may include a mode designator that allows the camera functionality (e.g., lens 120 and other elements of camera 260) to be used in connection with image recognition program 310 and control command generator 320 to control an application executed by mobile terminal 100 and/or control a controllable device 510.

For example, mobile terminal 100 may include a menu that allows the user of mobile terminal 100 to designate that camera 260 is to be used in a control mode, as opposed to in a conventional camera mode. The user may receive the menu by, for example, pressing a button in user control area 150 (FIG. 1B). One of the options in the menu may allow the user to put camera 260 into a mode associated with performing control actions. Alternatively, input device 240 may include a camera button located in user control area 150 that allows a user to select whether camera 260 is in a mode associated with performing control actions or in a conventional camera mode. In either case, mobile terminal 100 may allow the user to toggle between a conventional camera mode and a control mode associated with camera 260.

CONCLUSION

Implementations consistent with the invention allow a user to perform control actions in an efficient manner by using a camera function to provide gestures in lieu of manually entering control inputs to a keypad of a control device. This may allow a user to easily provide relatively simple gestures to perform desired actions and may enhance the functionality of for example, a mobile terminal or other device.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been mainly described in the context of a mobile terminal that includes a camera. The invention, however, may be used in other devices, such as in a remote control device that includes a camera.

In addition, the invention has been mainly described in the context of providing hand gestures that correlate to various commands/control actions. In some implementations, other gestures, such as facial expressions, may be used to represent various commands/control actions. For example, a face with one eye closed/winking may be used to represent a particular command (e.g., skip to next song), a smiling face may be used to indicate to another command (e.g., increase volume) and a frowning face may be used to indicate still another command (e.g., turn off the device). In still other implementations, a pointing device may be used to provide motion related inputs via lens 120 instead of one or more hands. For example, the user may simply move a pointing device (e.g., a pen/pencil or some other device) in front of lens 120 to convey the desired motion pattern (e.g., left to right, right to left, top to bottom, bottom to top). The particular motion may then be correlated to a particular command.

In addition, in some implementations, mobile terminal 100 may provide feedback to the user of mobile terminal 100 after a gesture is identified. In this implementation, image recognition program 310 may provide text on, for example, display screen 140 indicating the particular command identified by image recognition program 310, such as "skip to next song". In some implementations, mobile terminal 100 may provide audio in addition to or instead of text identifying the particular command. For example, mobile terminal 100 may voice "skip to next song". In still further alternatives, mobile terminal 100 may prompt the user to reply to the displayed/voiced message, such as indicate whether the identified command is correct before performing the particular action.

Further, while a series of acts has been described with respect to FIGS. 4 and 7, the order of the acts may be varied in other implementations consistent with the invention. Moreover, non-dependent acts may be performed in parallel.

It will also be apparent to one of ordinary skill in the art that aspects of the invention, as described above, may be implemented in cellular communication devices/systems, methods, and/or computer program products. Accordingly, the invention may be embodied in hardware and/or in software (including firmware, resident software, micro-code, etc.). Furthermore, aspects consistent with the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile terminal, comprising:
   a memory to store a plurality of images of gestures made using one or more body parts, each of the images corresponding to one of a plurality of commands;
   a lens to receive a gesture made by a user of the mobile terminal; and
   processing logic to:
   match the gesture to one of the plurality of gestures stored in the memory, and
   generate a command of the plurality of commands corresponding to the one of the plurality of gestures, the command instructing the mobile terminal or an external device to perform a control action.

2. The mobile terminal of claim 1, where the gesture comprises a motion made in front of the lens by the user using at least one hand, and when identifying the gesture, the processing logic is configured to:
   identify a pattern associated with the motion, and when generating a command, the processing logic is configured to:
   identify one of the commands, in the memory as corresponding to the pattern.

3. The mobile terminal of claim 1, further comprising:
   a transmitter to transmit the command to the external device.

4. The mobile terminal of claim 1, where the external device comprises a television, a digital video disc player or a video game system and the command instructs the external device to at least one of increase volume, decrease volume, change a channel, pause the external device or turn off the external device.

5. The mobile terminal of claim 1, where the external device plays music and the command instructs the external device to increase volume, decrease volume, skip to another song, go back to a previous song or stop playing a song.

6. The mobile terminal of claim 1, where the processing logic is farther configured to:
perform a control action for an application executed by the mobile terminal in response to the command.

7. The mobile terminal of claim 6, where the control action comprises at least one of increasing volume of a song being played by the mobile terminal or output to the external device, decreasing volume of a song being played by the mobile terminal or output to the external device, skipping to another song, or stopping playing of a song being played by the mobile terminal or output to the external device.

8. The mobile terminal of claim 1, where the processing logic is further configured to:
provide a user interface to:
allow a user to provide gestures to the mobile terminal, each of the gestures corresponding to one of a plurality of commands.

9. The mobile terminal of claim 8, where when allowing the user to provide gestures, the lens is configured to:
focus on a first gesture provided by the user in response to a prompt via the user interface, the first gesture including at least a portion of the user's hand, where the processing logic is further configured to:
identify the first gesture, and
correlate the first gesture to a first one of the plurality of commands.

10. The mobile terminal of claim 1, where the mobile terminal comprises a cellular telephone.

11. The mobile terminal of claim 1, where the processing logic is further configured to:
capture an image of a user performing a gesture;
storing the image of the user performed gesture in the memory; and
associating the image of the user performed gesture with one of the plurality of commands.

12. A method performed by a communication device, comprising:
storing a plurality of images in the communication device, each of the plurality of images being associated with one of a plurality of commands;
capturing a gesture provided by a user of the communication device, the gesture including an image captured by a lens of the communication device;
comparing the captured image to the plurality of stored images;
identifying the gesture by identifying in one of the plurality of stored images as corresponding to the captured image; and
generating a command based on the identified gesture, the command instructing the communication device to perform a control action.

13. The method of claim 12, where the gesture comprises a motion made in front of the lens of the communication device by the user using at least one hand, and the identifying the gesture comprises:
identifying a pattern associated with the motion, and
correlating the pattern to an image, and the generating a command comprises:
generating a first command corresponding to the pattern.

14. The method of claim 12, where each of the plurality of stored images includes a gesture made using one or more fingers.

15. The method of claim 12, further comprising:
transmitting the command to an external device, the command instructing the external device to perform a control action on the external device.

16. The method of claim 15, where the transmitting the command to an external device comprises:
transmitting the command to a television, a digital video disc player or a video game system, the command instructing the television, the digital video disc player or the video game system to at least one of increase volume, decrease volume, change a channel or turn off the television, the digital video disc player or the video game system.

17. The method of claim 15, where the transmitting the command to an external device comprises:
transmitting the command to an external device that plays music, the command instructing the external device to increase volume, decrease volume, skip to another song, go back to a previous song, or stop playing a song.

18. The method of claim 12, further comprising:
performing a control action in response to the command, the control action comprising at least one of increasing volume of a song being played by the communication device or output to an external device, decreasing volume of a song being played by the communication device or output to the external device, skipping to another song or stopping playing of a song being played by the communication device or output to the external device.

19. The method of claim 12, further comprising:
providing a user interface to a user of the communication device, the user interface configured to allow the user to provide a plurality of gestures to the communication device, each of the plurality of gestures corresponding to one of a plurality of commands;
receiving a gesture via the interface;
identifying a first one of the plurality of commands based on the received gesture, and
performing an action based on the first command.

20. The method of claim 19, where the performing an action comprises:
at least one of increasing volume of a song, decreasing volume of a song, skipping to another song or going back to a previous song.

21. The method of claim 12, further comprising:
capturing an image of a user performing a gesture;
storing the image of the user performed gesture; and
associating the image of the user performed gesture with one of the plurality of commands.

22. A device, comprising:
means for capturing an image of a gesture;
means for identifying the captured image as corresponding to a command based on comparing the captured image to one or more stored images; and
means for generating the command based on the identified captured image, the command instructing the device to perform a control action.

23. The device of claim 22, further comprising:
means for transmitting the command to an external device, the command instructing the external device to perform a control function on the external device.

24. A computer-readable memory device having stored thereon a plurality of instructions which, when executed by at least one processor, cause the at least one processor to:
- receive an image captured by a lens;
- identify the captured image as corresponding to a first image by comparing the captured image to at least one stored image;
- generate a command based on the first image, the command instructing a mobile terminal on which the at least one processor resides to perform a control action or transmit the command to a device external to the mobile terminal.

25. The computer-readable memory device of claim 24, where the captured image comprises an image made by the user and when identifying the captured image, the at least one processor is configured to compare the image made by the user to a plurality of stored images.

26. The computer-readable memory device of claim 24, where the captured image comprises a motion made by the user and when identifying the captured image, the at least one processor is configured to compare the motion to a plurality of stored motions.

27. The computer-readable memory device of claim 24, where the instructions further cause the processor to:
- forward the command for transmission to the external device, the command instructing the external device to perform a control function on the external device.

28. The computer-readable memory device of claim 24, where the instructions further cause the at least one processor to:
- capture an image of a user performing a gesture;
- store the image of the user performed gesture; and
- associate the image of the user performed gesture with one of the plurality of commands.

* * * * *

UNITED STATES PATENT AND TRADEMARK OFFICE
CERTIFICATE OF CORRECTION

PATENT NO. : 7,721,207 B2  Page 1 of 1
APPLICATION NO. : 11/421289
DATED : May 18, 2010
INVENTOR(S) : Peter A. Nilsson It is certified that error appears in the above-identified patent and that said Letters Patent is hereby corrected as shown below:

Column 13, line 57 should spell: "identifying the gesture by identifying one of the plurality".

Signed and Sealed this

Twenty-ninth Day of June, 2010

David J. Kappos
*Director of the United States Patent and Trademark Office*